(12) United States Patent
Sutter et al.

(10) Patent No.: US 11,000,169 B2
(45) Date of Patent: *May 11, 2021

(54) ILLUMINATOR OPTIC FOR ROBOTIC CLEANER

(71) Applicant: SharkNinja Operating, LLC, Needham, MA (US)

(72) Inventors: Catriona C. A. Sutter, Brookline, MA (US); Melinda L. Liggett, Watertown, MA (US); Isaku D. Kamada, Brighton, MA (US); Emily Pearce, Somerville, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,811

(22) Filed: Nov. 7, 2019

(65) Prior Publication Data

US 2020/0138260 A1    May 7, 2020

Related U.S. Application Data

(60) Provisional application No. 62/756,752, filed on Nov. 7, 2018.

(51) Int. Cl.
*A47L 9/30* (2006.01)
*F21V 8/00* (2006.01)

(52) U.S. Cl.
CPC .............. *A47L 9/30* (2013.01); *G02B 6/0031* (2013.01); *G02B 6/0035* (2013.01); *G02B 6/0058* (2013.01); *G02B 6/0068* (2013.01); *G02B 6/0083* (2013.01); *A47L 2201/00* (2013.01); *G02B 6/0091* (2013.01)

(58) Field of Classification Search
CPC ........................................................ A47L 9/30
See application file for complete search history.

(56) References Cited

U.S. PATENT DOCUMENTS

| | | |
|---|---|---|
| 9,574,762 B1 | 2/2017 | Grillo et al. |
| 9,721,586 B1 | 8/2017 | Bay et al. |
| 10,001,592 B2 | 6/2018 | Oh et al. |
| 10,272,828 B2 | 4/2019 | White et al. |
| 2008/0260328 A1* | 10/2008 | Epstein ................ G02B 6/0028 385/32 |
| 2011/0157899 A1 | 6/2011 | Ko |
| 2014/0226361 A1* | 8/2014 | Vasylyev .............. F21V 7/0091 362/606 |
| 2018/0050634 A1* | 2/2018 | White ................... A47L 9/2852 |

OTHER PUBLICATIONS

PCT Search Report and Written Opinion dated Jan. 29, 2020, received in PCT Application No. PCT/US19/60228, 10 pgs.

* cited by examiner

*Primary Examiner* — Evan P Dzierzynski
*Assistant Examiner* — Keith G. Delahoussaye
(74) *Attorney, Agent, or Firm* — Grossman Tucker Perreault & Pfleger, PLLC

(57) ABSTRACT

A robotic cleaner may include a body and an illuminator assembly. At least a portion of the illuminator assembly may be disposed within the body. The illuminator assembly may include an illuminator optic configured to emit light from an illumination surface and an illumination guide configured to direct light into the illuminator optic. The illumination guide may have a cavity. The cavity may include a reflecting surface and a directing surface, the reflecting surface being positioned opposite the directing surface.

19 Claims, 6 Drawing Sheets

ILLUMINATOR OPTIC FOR ROBOTIC CLEANER

CROSS-REFERENCE TO RELATED APPLICATIONS

The present application claims the benefit of U.S. Provisional Application Ser. No. 62/756,752, filed on Nov. 7, 2018, entitled Illuminator Optic for Robotic Cleaner, which is fully incorporated herein by reference.

TECHNICAL FIELD

The present disclosure relates to robotic cleaners and more particularly to a robotic vacuum cleaner.

BACKGROUND INFORMATION

Robotic cleaners have become an increasingly popular appliance for automated cleaning applications. For example, robotic vacuum cleaners may be used to vacuum surfaces with little or no user interaction. Robotic vacuum cleaners may include a suction system as well as various cleaning implements and agitators such as rotating brush rolls and side brushes.

BRIEF DESCRIPTION OF THE DRAWINGS

These and other features and advantages will be better understood by reading the following detailed description, taken together with the drawings wherein.

DETAILED DESCRIPTION

The present disclosure is generally directed to a robotic cleaner having an illuminator assembly. The robotic cleaner includes a body. The body includes an illuminator assembly. The illuminator assembly includes an illuminator optic that is visible to a user of the robotic cleaner. The illuminator optic can generally be described as a light guide configured to diffuse light passing therethrough such that an illumination surface of the illuminator optic appears luminescent. As such, the illuminator optic includes a light diffusing material such that light received within the illuminator optic is diffused when traveling therethrough.

One or more light sources may be disposed on a printed circuit board disposed within the body of the robotic cleaner. The light sources are horizontally offset from a light receiving surface of the illuminator optic, wherein the light sources are disposed between the printed circuit board and the illuminator optic. An emission axis of the one or more light sources extends generally parallel to the illuminator optic. As such, the emitted light is reflected at least once before being incident on the light receiving surface of the illuminator optic. Reflection of the light prior to its incidence on the light receiving surface of the illuminator optic, may result in the light having a more consistent appearance (e.g., a more consistent intensity) when compared to light being emitted directly into the illuminator optic.

Figure 1:
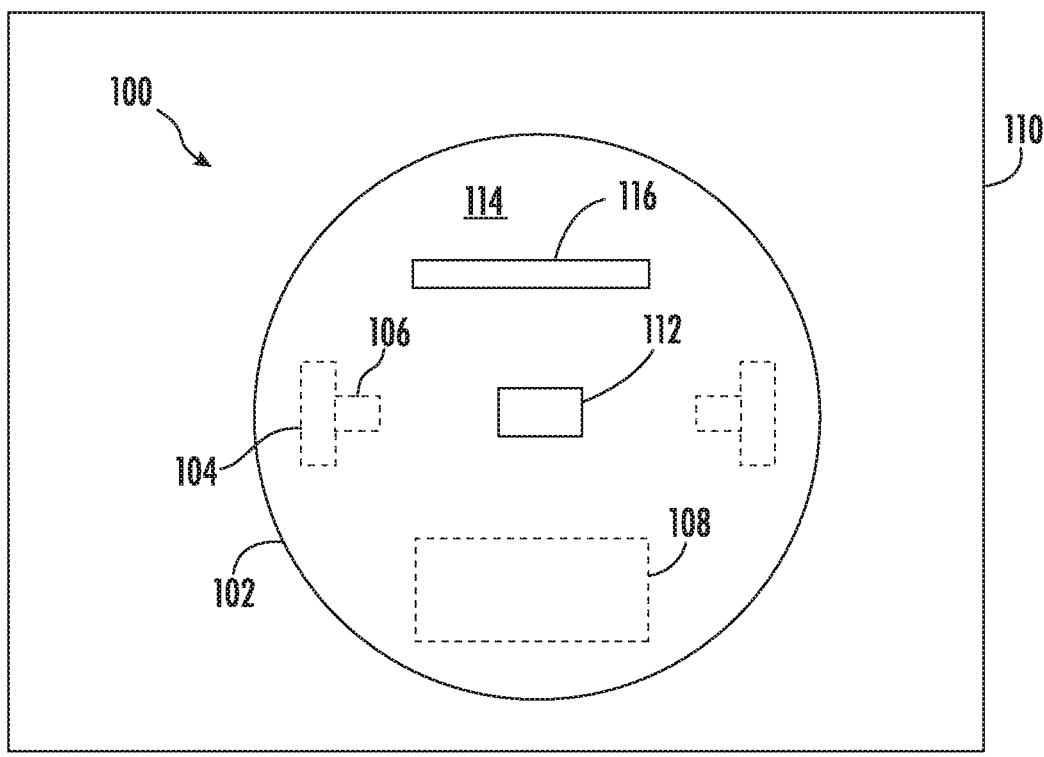
FIG. 1 shows a top view of a schematic example of a robotic cleaner, consistent with embodiments of the present disclosure.

FIG. 1 shows a schematic example of a robotic cleaner 100 (e.g., a robotic vacuum cleaner) having a body 102, at least one wheel 104 (shown in hidden lines) coupled to the body 102, at least one drive motor 106 (shown in hidden lines) configured to cause a corresponding wheel 104 to rotate, urging the body 102 across a surface to be cleaned 110 (e.g., a floor), and a dust cup 108 (shown in hidden lines) configured to receive debris from the surface to be cleaned 110. One or more inputs 112 may be disposed on a top surface 114 of the body 102 of the robotic cleaner 100. The inputs 112 may be configured to cause the robotic cleaner 100 to engage in various behaviors (e.g., start/stop cleaning, return to a docking station, and/or any other behavior).

As also shown, the robotic cleaner 100 can include an illuminator assembly 116. At least a portion of the illuminator assembly 116 can be disposed within the body 102. The illuminator assembly 116 can be configured to be illuminated according to a predetermined pattern and/or color based, at least in part, on a status of the robotic cleaner 100. For example, the illuminator assembly 116 can indicate whether the robotic cleaner 100 is in a standby state, a cleaning state, a fault state, and/or any other state.

The illuminator assembly 116 can have any shape. For example, the illuminator assembly 116 may be square shaped, rectangle shaped, annular shaped, octagonal shaped, triangle shaped, and/or any other shape. In some instances, the illuminator assembly 116 may extend around a non-illuminated volume (e.g., an annular shaped illuminator assembly 116 may extend around a non-illuminated circular volume).

Figure 2:
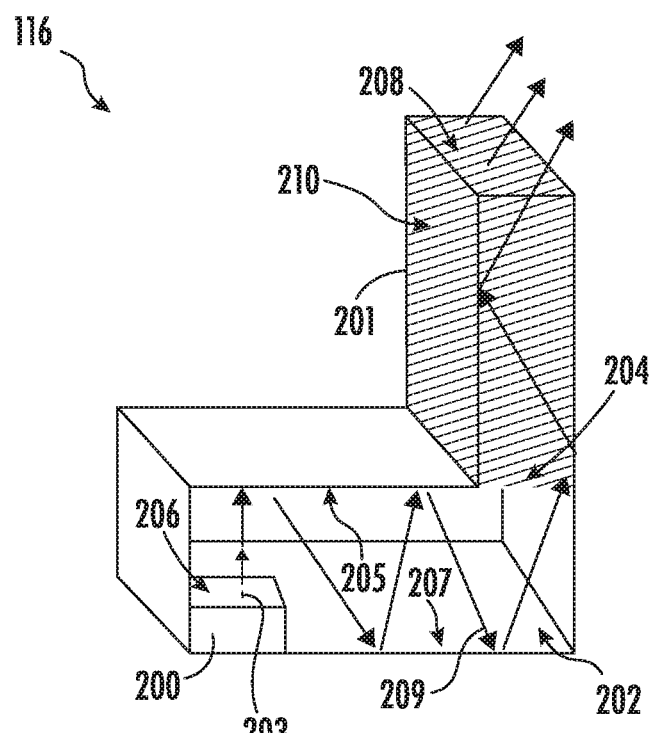
FIG. 2 shows a cross-sectional perspective view of a schematic example of an illuminator assembly, consistent with embodiments of the present disclosure.

FIG. 2 shows a schematic cross-sectional view of the illuminator assembly 116. As shown, the illuminator assembly 116 includes an illuminator optic 201 configured to emit light from an illumination surface 208, an optical cavity 202, and an optical emitter 200 (e.g., a light emitting diode) disposed within the optical cavity 202. The optical cavity 202 is optically coupled to the illuminator optic 201 such that light emitted by the optical emitter 200 is incident on a light receiving surface 204 of the illuminator optic 201. As shown, the optical emitter 200 is horizontally offset from the illuminator optic 201 (e.g., the light receiving surface 204 of the illuminator optic 201) and has an emission axis 203 that extends generally parallel to one or more side surfaces 210 of the illuminator optic 201.

A light emitting surface 206 of the optical emitter 200 can be oriented such that it faces in a direction of the illumination surface 208 of the illuminator optic 201 (e.g., the light emitting surface 206 is substantially parallel to the illumination surface 208). As such, when the optical emitter 200 is horizontally offset from the light receiving surface 204 of the illuminator optic 201, light emitted by the optical emitter 200 is reflected off at least one surface of the optical cavity 202 before being incident on the light receiving surface 204. This may result in a more uniform intensity of light being emitted from the illumination surface 208 of the illuminator optic 201.

Light may be incident on the light receiving surface 204 at an angle such that, after passing into the illuminator optic 201, the light is incident on the one or more side surfaces 210 of the illuminator optic 201. As such, the light may be reflected off one or more of the side surfaces 210 before passing through the illumination surface 208. In other words, the illuminator optic 201 can be configured to encourage light to be internally reflected within the illuminator optic 201. An example light path is generally illustrated by arrows 209 in FIG. 2.

While the illuminator optic 201 is shown as not extending within the optical cavity 202, other configurations are possible. For example, the illuminator optic 201 can extend at least partially within the optical cavity 202 such that at least two light receiving surfaces 204 can receive light emitted by the optical emitter 200. In some instances, the illuminator optic 201 can extend from a top surface 205 of the optical cavity 202 into the optical cavity 202 and to a bottom surface 207 of the optical cavity 202.

Figure 3:
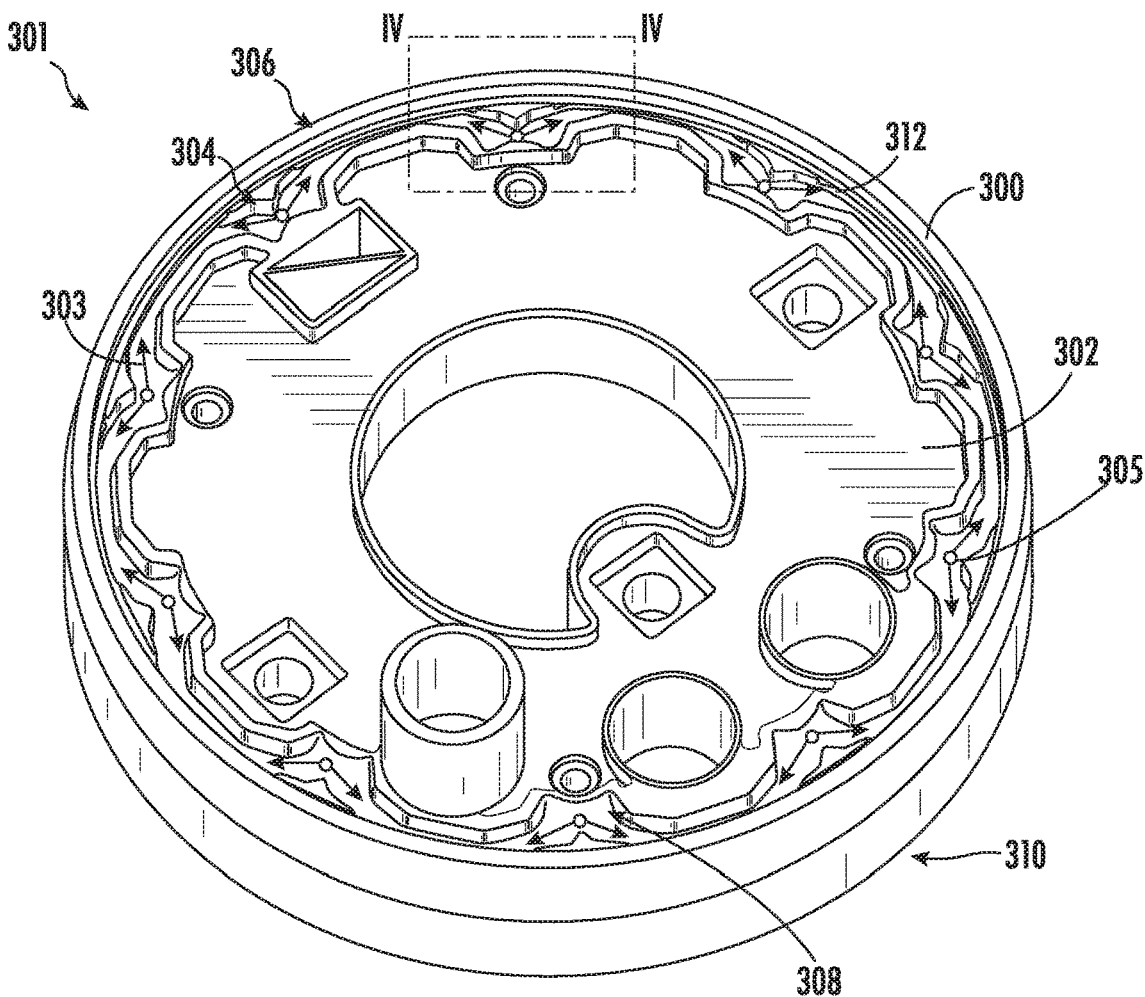
FIG. 3 shows a perspective view of an annular illumination assembly, consistent with embodiments of the present disclosure.

FIG. 3 shows a perspective view of an annular illuminator assembly 301, which may be an example of the illuminator assembly 116 of FIG. 1. The illuminator assembly 301 can include an annular illuminator optic 300 that extends around an illumination guide 302, the illumination guide 302 being configured to direct light into the illuminator optic 300. The illumination guide 302 defines at least one cavity 304 configured to receive an optical emitter 305 (e.g., a light emitting diode). The cavity 304 is configured such that at least a portion of light emitted from the optical emitter 305 is reflected within the cavity 304 before being incident on a light receiving surface 306 of the illuminator optic 300. For example, the illumination guide 302 can be configured such that the emitted light is directed toward the illuminator optic 300 along a light path 303.

For example, the optical emitter 305 can be configured to emit light towards a top surface 308 of the cavity 304 such that at least a portion of the emitted light is incident on and reflected from the top surface 308. In other words, the optical emitter 305 can be configured to emit light in a direction of an illumination surface 310 of the illuminator optic 300. The cavity 304 can be configured to direct the emitted light towards a respective one or more channels 312. The channels 312 optically couple the cavity 304 to the receiving surface 306 of the illuminator optic 300.

Figure 4:
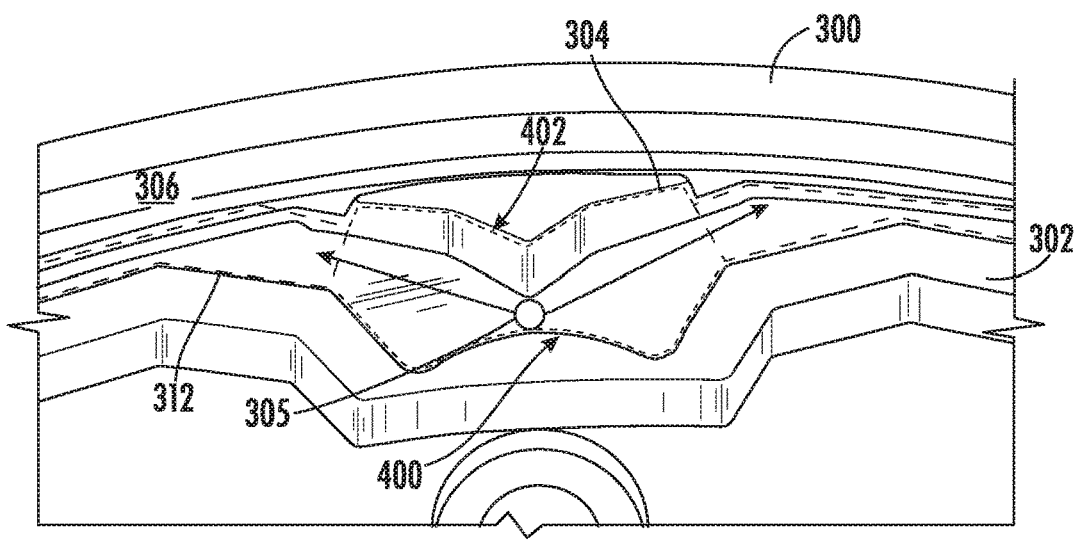
FIG. 4 shows an enlarged view of a portion of the annular illuminator assembly of FIG. 3, consistent with embodiments of the present disclosure.

FIG. 4 shows an enlarged view of the illuminator assembly 301 taken at detail view IV-IV of FIG. 3. As shown, the cavity 304 can include a reflecting surface 400 configured to direct light emitted by the optical emitter 305 towards the channels 312. At least a portion of the reflecting surface 400 can extend in a direction of the illuminator optic 300. As shown, at least a portion of the top surface 308 may define at least a portion of the reflecting surface 400.

The reflecting surface 400 can include at least one arcuate portion. In some instances, the reflecting surface 400 can have a convex shape in a first plane and a concave shape in a second plane. For example, and as shown, the reflecting surface 400 can have a convex shape in a horizontal plane (e.g., a plane generally parallel to a surface to be cleaned) and a concave shape in a vertical plane (e.g., a plane generally perpendicular to the surface to be cleaned).

The cavity 304 can also include a directing surface 402 configured to direct light emitted by the optical emitter 305 into a respective channel 312. As shown, the directing surface 402 extends in a direction of the reflecting surface 400. The directing surface 402 can have a generally triangular shape with one or more planar sides configured to direct light into a respective channel 312.

The directing surface 402 is positioned opposite the reflecting surface 400 such that at least a portion of the light incident on the reflecting surface 400 is directed generally towards the directing surface 402. As such, the reflecting surface 400 and the directing surface 402 can generally be described as cooperating to direct light along respective channels 312 and into the light receiving surface 306 of the illuminator optic 300. At least a portion of the light incident on the light receiving surface 306 may pass into the illuminator optic 300. In some instances, at least a portion of the light incident on the light receiving surface 306 may be reflected from the light receiving surface 306. The reflected light may continue to travel along the respective channel 312. As light reflects along the channel 312, a portion of the light may enter the illuminator optic 300 at different locations along the light receiving surface 306.

Reflection of light emitted by the optical emitter 305 at least once before entering the illuminator optic 300 may result in the light emitted from the illumination surface 310 having a more uniform appearance (e.g., intensity) when compared to light emitted directly into the illuminator optic 300. As such, in some instances, the cavity 304 and/or the channels 312 can be configured to increase the number of reflections of the emitted light prior to the light entering the illuminator optic 300. For example, reflection of the emitted light may prevent the emitted light from directly entering the illuminator optic 300. Directly emitting light into the illuminator optic 300 may create a bright spot on the illumination surface 310. In other words, the directing surface 402 can be positioned such that light emitted from the optical emitter 305 prevents light from being transmitted directly from the optical emitter 305 and into the illuminator optic 300, which may reduce or prevent the appearance of bright spots on the illumination surface 310. In some instances, for example, a portion (e.g., at least 80%, 90%, or 95%) of the illumination surface 310 illuminated by a respective optical emitter 305 may have a substantially uniform intensity (e.g., the illumination intensity varies by less than 5%, 10%, or 15%) over the portion of the illumination surface 310 that is illuminated by the optical emitter 305.

Figure 5:
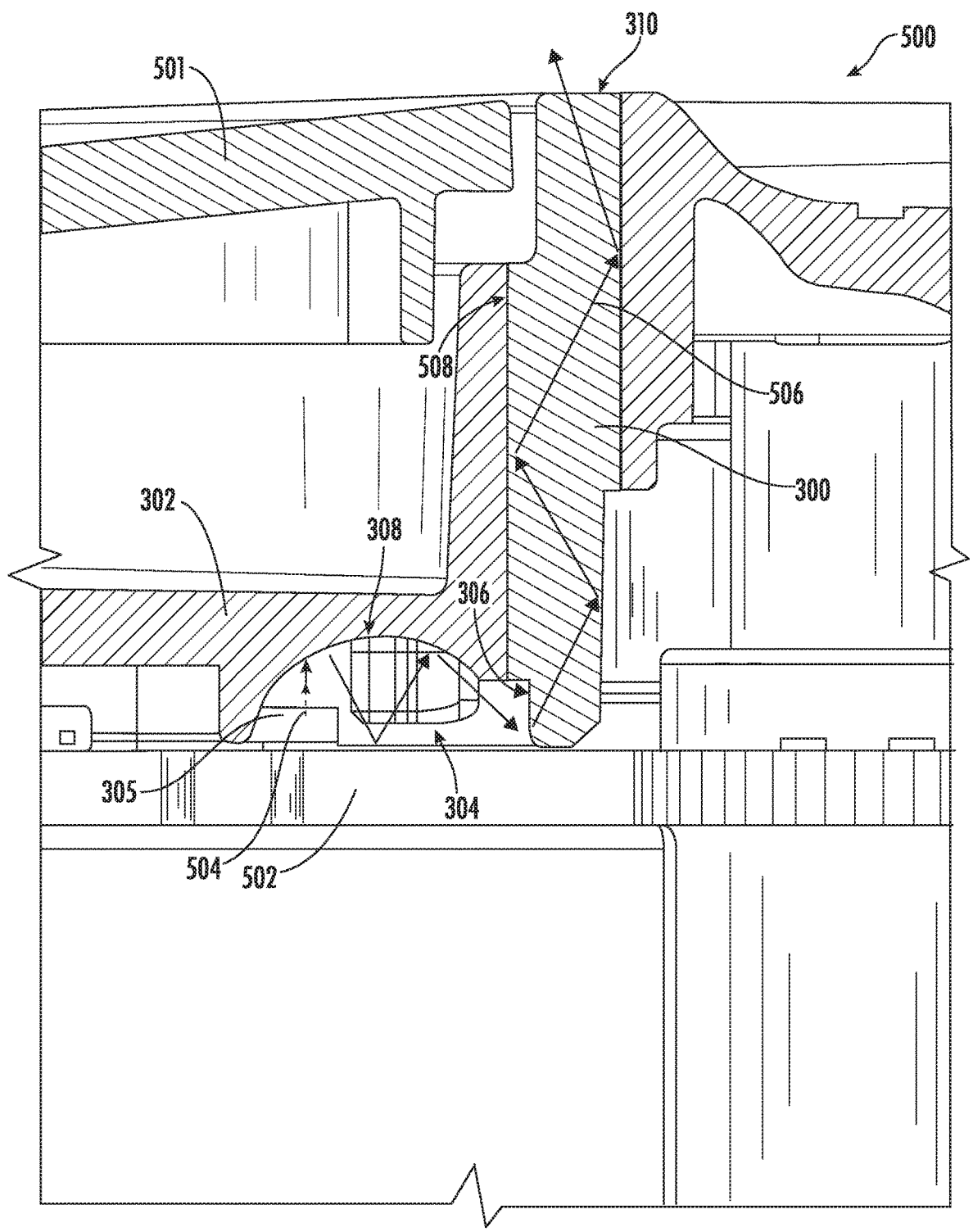
FIG. 5 shows a cross-sectional view of a portion of a robotic cleaner having the illuminator optic of FIG. 3 installed therein, consistent with embodiments of the present disclosure.

FIG. 5 shows a cross-sectional view of a portion of a robotic cleaner 500, which may be an example of the robotic cleaner 100 of FIG. 1. The robotic cleaner 500 includes the illuminator assembly 301 of FIG. 3. As shown, the optical emitter 305 is coupled to a printed circuit board (PCB) 502 disposed within a body 501 of the robotic cleaner 500 such that the optical emitter 305 is disposed between the PCB 502 and the illumination guide 302 (e.g., such that at least one optical emitter 305 is received within a respective cavity 304). The PCB 502 can define at least a portion of the cavity 304 such that light emitted from the optical emitter 305 is reflected from the top surface 308 of the cavity 304 towards the PCB 502 such that it can be reflected from the PCB 502. Light reflected from the PCB 502 may be incident on the top surface 308 of the cavity 304 or the light receiving surface 306 of the illuminator optic 300.

As shown, the light receiving surface 306 can extend substantially parallel (e.g., within plus or minus 1°, 2°, 3°, 4°, or 5° of parallel) to an emission axis 504 of the optical emitter 305. Alternatively, the emission axis 504 may extend transverse to (e.g., substantially perpendicular to) the light receiving surface 306 (e.g., as shown in FIG. 2). In some instances, the illuminator optic 300 can extend within the cavity 304 such that two or more light receiving surfaces 306 are capable of receiving light. For example, one or more of the light emitting surfaces 306 can extend substantially parallel (e.g., within plus or minus 1°, 2°, 3°, 4°, or 5° of parallel) to the emission axis 504 of the optical emitter 305 and one or more of the light emitting surfaces 306 can extend transverse to the emission axis 504 of the optical emitter 305.

Emitted light can generally follow a light path 506 that extends from the optical emitter 305 through the cavity 304 and into the illuminator optic 300. The illuminator optic 300 can be configured to encourage the internal reflection of light traveling therein (or passing therethrough). For example, the illuminator optic 300 can have one or more sidewalls 508 having a surface polish that encourages reflection. By way of further example, in some instances, one or more outer surfaces of the illuminator optic 300 can have a reflective material (e.g., a paint) applied thereto and/or at least a portion of the robotic cleaner 500 and/or the illumination guide 302 can be reflective (e.g., have a reflective paint applied thereto and/or be made of a reflective material).

The illuminator optic 300 can also be configured to diffuse the light extending (or passing) therethrough. In some instances, for example, the illuminator optic 300, the illumination guide 302, and/or the optical emitter 305 can be configured such that a portion (e.g., at least 80%, 90%, or 95%) of the illumination surface 310 illuminated by a respective optical emitter 305 may have a substantially uniform intensity (e.g., the illumination intensity varies by less than 5%, 10%, or 15%) over the portion of the illumination surface 310 that is illuminated by the optical emitter 305.

The illuminator optic 300 can be made of, for example, polycarbonate, glass, acrylic, and/or any other suitable light transmissive material. In some instances, the illumination surface 310 can be textured (e.g., etched) such that the illumination surface 310 encourages diffusion of light passing therethrough.

Figure 6:
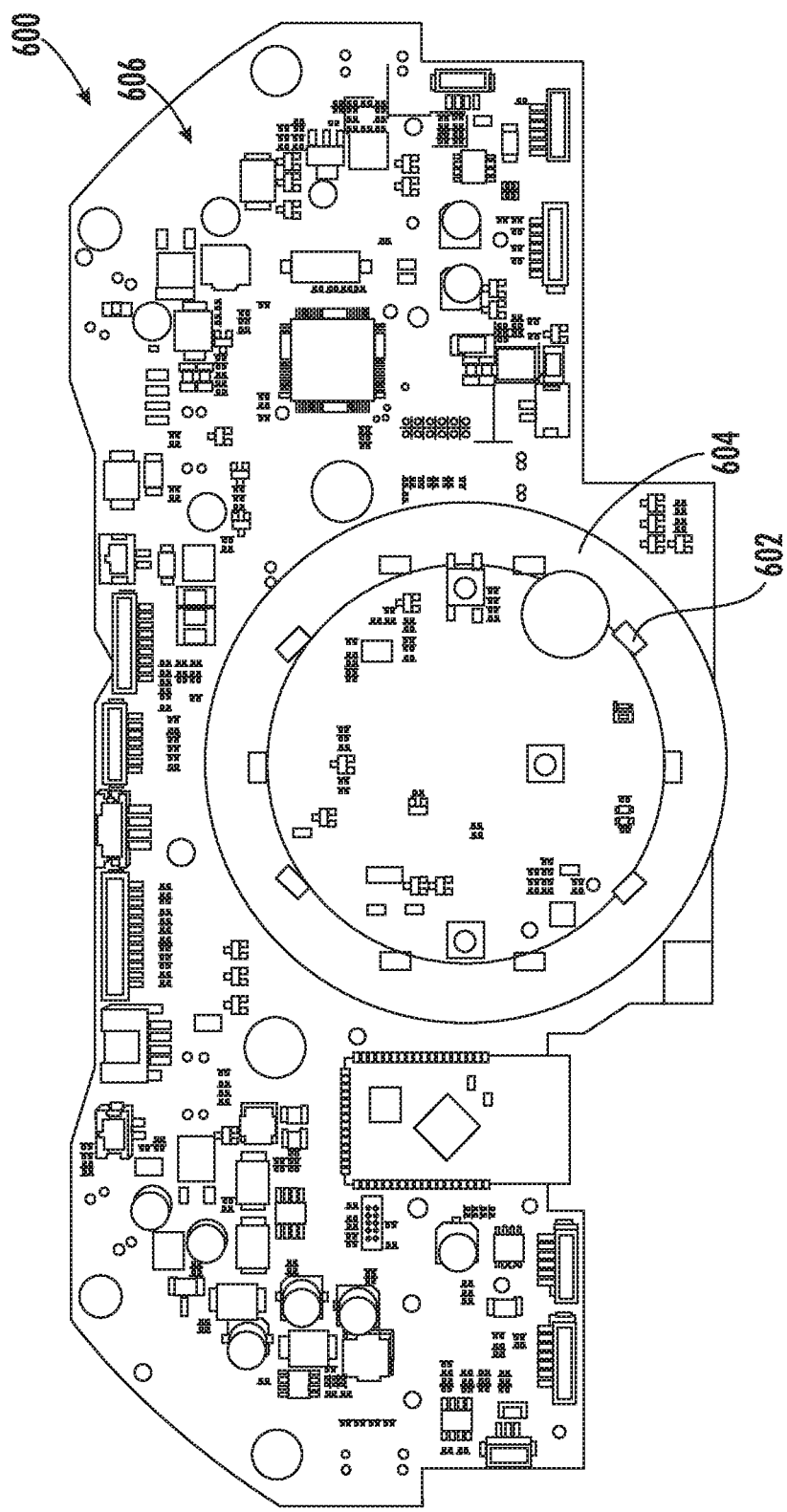
FIG. 6 shows a top view of a printed circuit board, consistent with embodiments of the present disclosure.

FIG. 6 shows a top view of a PCB 600, which may be an example of the PCB 502 of FIG. 5. As shown, the PCB 600 includes one or more light emitting diodes (LEDs) 602, which may be an example of the optical emitters 305 of FIG. 3. The LEDs 602 have an emission axis that extends transverse to (e.g., substantially perpendicular to) a top surface 606 the PCB 600 such that light is emitted in a direction away from the PCB 600.

The LEDs 602 are arranged such that an illumination guide (e.g., the illumination guide 302 of FIG. 3) can be positioned above the LEDs 602 such that the illumination guide directs light emitted by the LEDs 602 into an illuminator optic (e.g., the illuminator optic 300 of FIG. 3).

As shown, the PCB 600 can include a reflective portion 604 that extends at least partially around each of the LEDs 602. The reflective portion 604 can be configured to direct light incident on the reflective portion 604 in a direction away from the PCB 600. As such, reflection within the cavities defined by the illumination guide are encouraged.

The reflective portion 604 may be applied to the top surface 606 of the PCB 600 using, for example, a silk-screening process. In some instances, the reflective portion 604 may be an adhesive label coupled to the top surface 606, a paint applied to the top surface 606, and/or any other reflective material.

Each of the LEDs 602 may be individually (or selectively) addressable. As such, the LEDs 602 can be configured to illuminate according to a pattern. By illuminating each of the LEDs 602 individually according to a pattern the illumination surface of the illuminator optic can be illuminated according to different patterns. For example, one or more segments/predetermined portions of the illuminating surface can be illuminated to form a static or moving pattern by individually illuminating respective ones of the LEDs 602 according to a pattern. As such, the illuminator optic can be used to communicate a status of a robotic cleaner (e.g., the robotic cleaner 100 of FIG. 1) to a user of the robotic cleaner using the illuminated patterns. Additionally, or alternatively, one or more of the LEDs 602 can be bi-colored LEDs (e.g., the LEDs 602 can be red/blue bi-colored LEDs). As such, in some instances, a status of the robotic cleaner can be communicated using a color of the light emitted from the illumination surface of the illuminator optic. For example, different colors and/or patterns can be used to indicate a status of the robotic cleaner. In some instances, a sound sequence may be used to communicate a status of the robotic cleaner. For example, a sound sequence may be associated with a respective light pattern (e.g., comprising one or more colors and/or illumination patterns).

Figure 7:
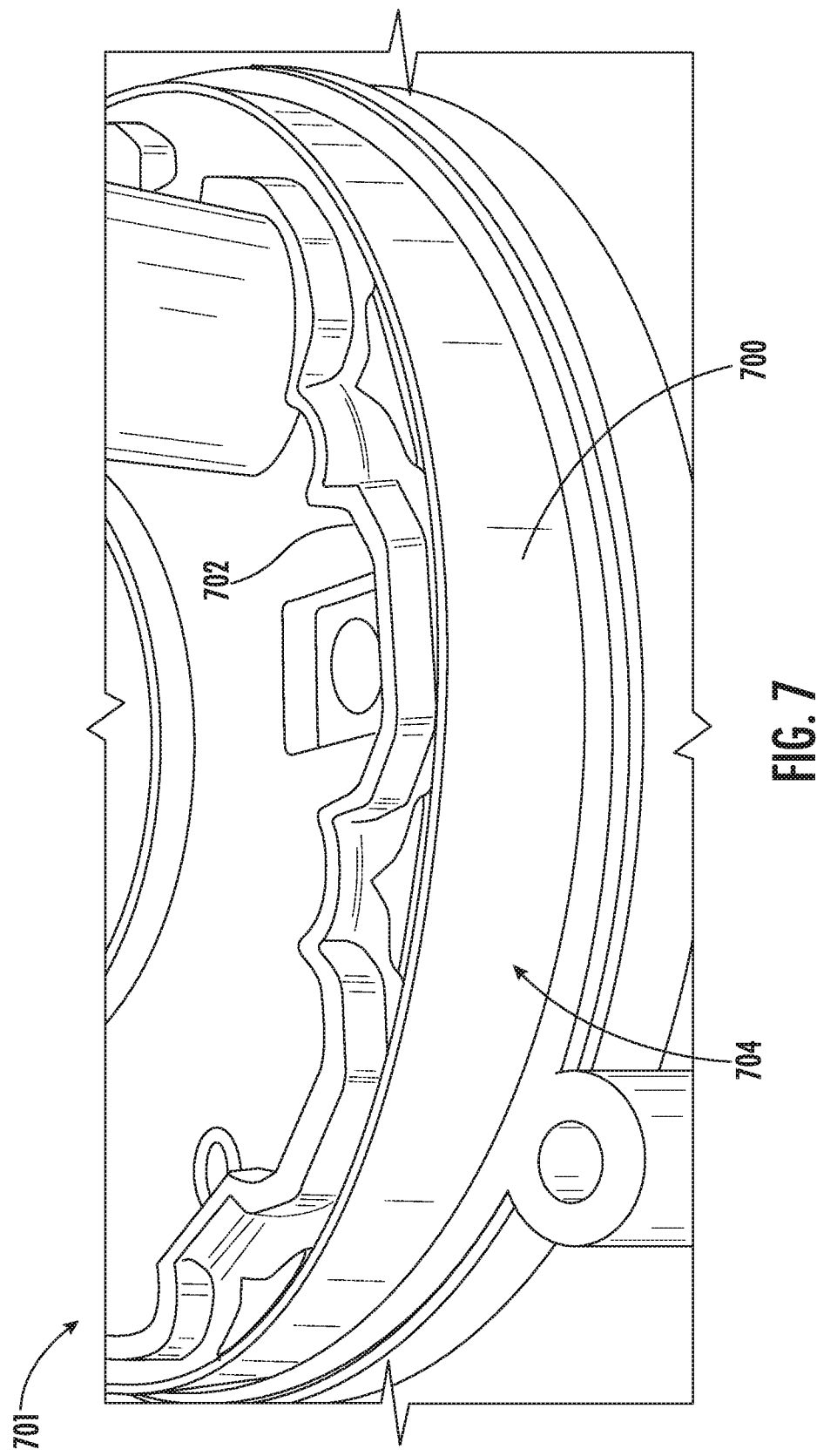
FIG. 7 shows a perspective view of a portion of an illuminator assembly, consistent with embodiments of the present disclosure.

FIG. 7 shows a perspective view of a portion of an illuminator assembly 701, which may be an example of the illuminator assembly 301 of FIG. 3. The illuminator assembly 701 includes an illuminator optic 700 and an illumination guide 702. The illuminator optic 700 may have a polished exterior surface 704 which is configured to cause light to internally reflect in a direction of the illumination guide 702. For example, the exterior surface 704 may have a substantially mirror-like finish. The illumination guide 702 can be made of a light reflective material (e.g., a white material) configured to cause light to internally reflect within the illuminator optic 700 in a direction of the exterior surface 704. As such, the exterior surface 704 of the illuminator optic 700 and the illumination guide 702 may generally be described as being configured to cause internal reflection of light within the illuminator optic 700.

Figure 8:
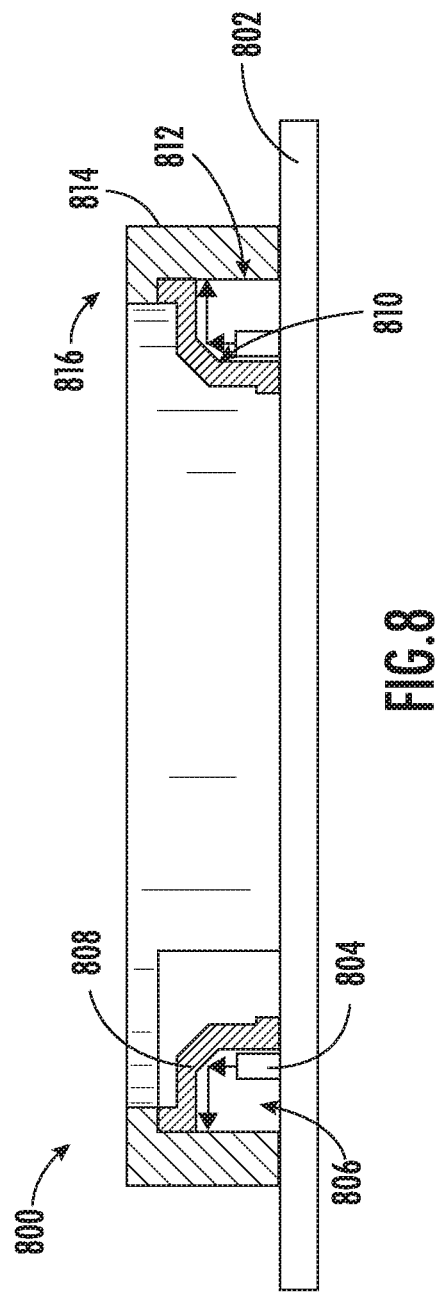
FIG. 8 shows a schematic cross-sectional view of an example of an illumination assembly coupled to a printed circuit board (PCB), consistent with embodiments of the present disclosure.

FIG. 8 shows a schematic example of an illuminator assembly 800, which may be an example of the illuminator assembly 116 of FIG. 1, coupled to a printed circuit board (PCB) 802. As shown, the PCB 802 includes a plurality of light emitting diodes (LEDs) 804 coupled thereto. Each of the LEDs 804 are disposed within a respective cavity 806 defined within an illumination guide 808 such that at least a portion of the light emitted by the LEDs 804 is reflected from a respective reflection surface 810 within the cavity 806. As shown, each reflection surface 810 is angled relative to an emission axis of corresponding LEDs 804 such that light incident on the reflection surface 810 is directed towards a light receiving surface 812 of an illuminator optic 814. At least a portion of the light incident on the light receiving surface 812 of the illuminator optic 814 may enter the illuminator optic 814 and be emitted from the illuminator optic 814 at an illumination surface 816.

An example of a robotic cleaner, consistent with the present disclosure, may include a body and an illuminator assembly. At least a portion of the illuminator assembly may be disposed within the body. The illuminator assembly may include an illuminator optic configured to emit light from an illumination surface and an illumination guide configured to direct light into the illuminator optic. The illumination guide may have a cavity. The cavity may include a reflecting surface and a directing surface, the reflecting surface being positioned opposite the directing surface.

In some instances, the robotic cleaner may further include a printed circuit board (PCB) that may have one or more optical emitters coupled thereto and the PCB may be disposed within the body such that the one or more optical emitters are received within a respective cavity of the illumination guide. In some instances, the PCB may include a reflective portion configured to extend at least partially around at least one of the one or more optical emitters. In some instances, the robotic cleaner may further include one or more optical emitters that may be horizontally offset from the illuminator optic. In some instances, at least a portion of light emitted from a respective one of the one or more optical emitters may be reflected from a top surface of a respective cavity. In some instances, a light receiving surface of the illuminator optic may extend substantially parallel to an emission axis of an optical emitter configured to emit light into the cavity. In some instances, the illuminator optic may be annular. In some instances, the illuminator optic may be configured to encourage internal reflection of light passing therethrough. In some instances, the illuminator optic may be configured to diffuse light passing therethrough.

Another example of a robotic cleaner, consistent with the present disclosure, may include a body, at least one wheel coupled to the body, at least one drive motor configured to cause a corresponding wheel to rotate, an illuminator assembly, wherein at least a portion of the illuminator assembly may be disposed within the body, and a printed circuit board (PCB) having one or more light emitting diodes (LEDs) coupled thereto. The illuminator assembly may include an illuminator optic configured to emit light from an illumination surface and an illumination guide configured to direct light into the illuminator optic. The PCB may be disposed within the body such that the one or more LEDs are received within a respective cavity defined within the illumination guide, wherein an emission axis of a respective one of the one or more LEDs extends substantially parallel to a light receiving surface of the illuminator optic.

In some instances, the PCB may include a reflective portion configured to extend at least partially around at least one of the one or more LEDs. In some instances, at least a portion of light emitted from a respective one of the one or more LEDs may be reflected from a top surface of a respective cavity. In some instances, each cavity may include a reflecting surface and a directing surface, the reflecting surface and the directing surface being configured to cooperate to direct light emitted by a respective LED to the light receiving surface of the illuminator optic. In some instances, the illuminator optic may be annular. In some instances, the illuminator optic may be configured to encourage internal reflection of light passing therethrough. In some instances, the illuminator optic may be configured to diffuse light passing therethrough.

An example of an illuminator assembly, consistent with the present disclosure, may include an illuminator optic configured to emit light from an illumination surface and an illumination guide configured to direct light into the illuminator optic. The illumination guide may have a cavity configured to receive an optical emitter. The cavity may include a reflecting surface and a directing surface, the reflecting surface and the directing surface being configured to cooperate to direct light emitted by the optical emitter to a light receiving surface of the illuminator optic.

In some instances, a light receiving surface of the illuminator optic may extend substantially parallel to an emission axis of the optical emitter. In some instances, the illuminator optic may be annular. In some instances, the illuminator optic may be configured to encourage internal reflection of light passing therethrough.

While the present disclosure has generally described the illuminator assembly has being used with a robotic cleaner, the illuminator assembly can be used with any device where communication using a color and/or light pattern may be desirable. For example, the illuminator assembly may be used with an upright vacuum cleaner, a docking station for a robotic cleaner, appliances (e.g., washer/dryers, kitchen stoves/ovens, and/or any other appliance), audio/video equipment (e.g., televisions, stereos, smart speakers, and/or any other audio/video equipment), and/or any other device.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaner comprising:
   a body; and
   an illuminator assembly, at least a portion of the illuminator assembly being disposed within the body, the illuminator assembly comprising:
   an illuminator optic having a light receiving surface and an illumination surface, the illumination surface being configured to emit light; and
   an illumination guide configured to direct light into the light receiving surface of the illuminator optic, the illumination guide having a cavity and a channel optically coupling the light receiving surface to the cavity, the cavity including a reflecting surface and a directing surface, each configured to direct light toward the channel, the reflecting surface being positioned opposite the directing surface.

2. The robotic cleaner of claim 1 further comprising a printed circuit board (PCB) having one or more optical emitters coupled thereto, the PCB being disposed within the body such that the one or more optical emitters are received within a respective cavity of the illumination guide.

3. The robotic cleaner of claim 2, wherein the PCB includes a reflective portion configured to extend at least partially around at least one of the one or more optical emitters.

4. The robotic cleaner of claim 1 further comprising one or more optical emitters horizontally offset from the illuminator optic.

5. The robotic cleaner of claim 4, wherein at least a portion of light emitted from a respective one of the one or more optical emitters is reflected from a top surface of a respective cavity.

6. The robotic cleaner of claim 1, wherein the light receiving surface of the illuminator optic extends substantially parallel to an emission axis of an optical emitter configured to emit light into the cavity.

7. The robotic cleaner of claim 1, wherein the illuminator optic is annular.

8. The robotic cleaner of claim 1, wherein the illuminator optic is configured to cause internal reflection of light passing therethrough.

9. The robotic cleaner of claim 1, wherein the illuminator optic is configured to diffuse light passing therethrough.

10. A robotic cleaner comprising:
a body;
at least one wheel coupled to the body;
at least one drive motor configured to cause a corresponding wheel to rotate;
an illuminator assembly, at least a portion of the illuminator assembly being disposed within the body, the illuminator assembly comprising:
an illuminator optic having a light receiving surface and an illumination surface, the illumination surface being configured to emit light; and
an illumination guide configured to direct light into the illuminator optic, the illumination guide having one or more cavities and one or more channels optically coupling the light receiving surface to a respective cavity; and
a printed circuit board (PCB) having one or more light emitting diodes (LEDs) coupled thereto, the PCB being disposed within the body such that the one or more LEDs are received within a respective cavity defined within the illumination guide, wherein an emission axis of a respective one of the one or more LEDs extends substantially parallel to the light receiving surface of the illuminator optic.

11. The robotic cleaner of claim 10, wherein the PCB includes a reflective portion configured to extend at least partially around at least one of the one or more LEDs.

12. The robotic cleaner of claim 10, wherein at least a portion of light emitted from a respective one of the one or more LEDs is reflected from a top surface of a respective cavity.

13. The robotic cleaner of claim 10, wherein each cavity includes a reflecting surface and a directing surface, the reflecting surface and the directing surface being configured to cooperate to direct light emitted by a respective LED to the light receiving surface of the illuminator optic.

14. The robotic cleaner of claim 10, wherein the illuminator optic is annular.

15. The robotic cleaner of claim 10, wherein the illuminator optic is configured to cause internal reflection of light passing therethrough.

16. The robotic cleaner of claim 10, wherein the illuminator optic is configured to diffuse light passing therethrough.

17. An illuminator assembly comprising:
an illuminator optic having a light receiving surface and an illumination surface, the illumination surface being configured to emit light, wherein the illuminator optic is annular; and
an illumination guide configured to direct light into the light receiving surface of the illuminator optic, the illumination guide having a cavity configured to receive an optical emitter and a channel optically coupling the cavity to the light receiving surface, the cavity including a reflecting surface and a directing surface, the reflecting surface and the directing surface being configured to cooperate to direct light emitted by the optical emitter to the light receiving surface of the illuminator optic.

18. The illuminator assembly of claim 17, wherein the light receiving surface of the illuminator optic extends substantially parallel to an emission axis of the optical emitter.

19. The illuminator assembly of claim 17, wherein the illuminator optic is configured to cause internal reflection of light passing therethrough.

* * * * *